United States Patent
Huie

(10) Patent No.: US 9,746,952 B2
(45) Date of Patent: Aug. 29, 2017

(54) FORCE ENHANCED INPUT DEVICE VIBRATION COMPENSATION

(71) Applicant: Synaptics Incorporated, San Jose, CA (US)

(72) Inventor: Mark Andrew Huie, Sunnyvale, CA (US)

(73) Assignee: Synaptics Incorporated, San Jose, CA (US)

( * ) Notice: Subject to any disclaimer, the term of this patent is extended or adjusted under 35 U.S.C. 154(b) by 219 days.

(21) Appl. No.: 14/675,638

(22) Filed: Mar. 31, 2015

(65) Prior Publication Data

US 2016/0291761 A1    Oct. 6, 2016

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01); *G06F 2203/04103* (2013.01); *G06F 2203/04106* (2013.01)

(58) Field of Classification Search
CPC . G06F 2203/04105; G06F 2203/04106; G06F 3/0414
See application file for complete search history.

(56) References Cited

U.S. PATENT DOCUMENTS

| | | |
|---|---|---|
| 5,510,813 A | 4/1996 | Makinwa et al. |
| 5,942,733 A | 8/1999 | Allen et al. |
| 5,943,044 A | 8/1999 | Martinelli et al. |
| 6,002,389 A | 12/1999 | Kasser |
| 7,154,481 B2 | 12/2006 | Cross et al. |
| 7,215,329 B2 | 5/2007 | Yoshikawa et al. |
| 7,395,717 B2 | 7/2008 | DeAngelis et al. |
| 7,538,760 B2 | 5/2009 | Hotelling et al. |
| 8,063,886 B2 | 11/2011 | Serban et al. |
| 8,627,716 B2 | 1/2014 | Son |
| 8,730,199 B2 | 5/2014 | Sleeman et al. |
| 8,857,274 B2* | 10/2014 | Mamigonians ......... G01L 1/142 73/862.626 |
| 2002/0175836 A1* | 11/2002 | Roberts ................. G06F 3/0414 341/34 |

(Continued)

*Primary Examiner* — Patrick Edouard
*Assistant Examiner* — Peijie Shen
(74) *Attorney, Agent, or Firm* — Osha Liang LLP

(57) ABSTRACT

An input device includes a first substrate including a force sensor electrode and several proximity sensor electrodes, which are configured to detect one or more input objects in a sensing region. The input device also includes a second substrate mechanically coupled to the first substrate, the second substrate including a first conductive portion. The force sensor electrode and the first conductive portion are configured to form a first variable capacitance for a determination of a first force applied by the one or more input objects to an input surface of the input device. The input device also includes a compensation sensor including a compensation sensor electrode disposed on the first substrate, a second conductive portion of the second substrate, and a compensation spring feature formed on the second substrate. The compensation spring feature is configured to facilitate a deflection of the second conductive portion relative to the compensation sensor electrode.

20 Claims, 7 Drawing Sheets

(56) References Cited

U.S. PATENT DOCUMENTS

| | | | |
|---|---|---|---|
| 2003/0079549 A1* | 5/2003 | Lokhorst | G01L 1/205 73/754 |
| 2004/0090429 A1 | 5/2004 | Geaghan et al. | |
| 2004/0227736 A1* | 11/2004 | Kamrath | G01L 1/146 345/173 |
| 2006/0260417 A1 | 11/2006 | Son et al. | |
| 2006/0279548 A1* | 12/2006 | Geaghan | G06F 3/0416 345/173 |
| 2007/0163346 A1* | 7/2007 | Platt | G01C 19/5719 73/504.16 |
| 2007/0229464 A1 | 10/2007 | Hotelling et al. | |
| 2007/0236466 A1 | 10/2007 | Hotelling | |
| 2008/0165159 A1* | 7/2008 | Soss | G06F 3/0414 345/174 |
| 2008/0174321 A1 | 7/2008 | Kang et al. | |
| 2008/0289887 A1* | 11/2008 | Flint | G06F 3/0414 178/18.03 |
| 2009/0151475 A1* | 6/2009 | Masaki | G01L 1/146 73/862.68 |
| 2010/0045624 A1* | 2/2010 | Hisatsugu | B60H 1/00985 345/173 |
| 2010/0242629 A1 | 9/2010 | Leuenberger et al. | |
| 2010/0253651 A1 | 10/2010 | Day | |
| 2012/2025876 | 10/2010 | Day | |
| 2010/0282000 A1 | 11/2010 | Gorjanc et al. | |
| 2011/0096025 A1 | 4/2011 | Slobodin et al. | |
| 2011/0141053 A1* | 6/2011 | Bulea | G06F 3/0416 345/174 |
| 2011/0227872 A1 | 9/2011 | Huska et al. | |
| 2011/0278078 A1* | 11/2011 | Schediwy | G01L 1/146 178/18.06 |
| 2012/0013573 A1 | 1/2012 | Liu et al. | |
| 2012/0026124 A1 | 2/2012 | Li et al. | |
| 2012/0038583 A1 | 2/2012 | Westhues et al. | |
| 2012/0062245 A1 | 3/2012 | Bao et al. | |
| 2012/0075243 A1* | 3/2012 | Doi | G06F 3/044 345/174 |
| 2012/0105367 A1 | 5/2012 | Son et al. | |
| 2013/0099802 A1* | 4/2013 | Hsieh | G06F 3/044 324/661 |
| 2013/0207927 A1* | 8/2013 | Pfau | G06F 3/016 345/174 |
| 2013/0342501 A1* | 12/2013 | Molne | G06F 3/0414 345/174 |
| 2014/0238152 A1* | 8/2014 | Kallassi | G01R 27/2605 73/862.626 |
| 2015/0309576 A1* | 10/2015 | Tissot | G06F 3/016 345/174 |

\* cited by examiner

FORCE ENHANCED INPUT DEVICE VIBRATION COMPENSATION

FIELD

This invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, distance, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, embodiments relate to an input device. The input device includes a first substrate that includes a force sensor electrode and a plurality of proximity sensor electrodes. The plurality of proximity sensor electrodes is configured to detect one or more input objects in a sensing region. The input device further includes a second substrate mechanically coupled to the first substrate. The second substrate includes a first conductive portion. The force sensor electrode and the first conductive portion are configured to form a first variable capacitance for a determination of a first force applied by the one or more input objects to an input surface of the input device. The input device further includes a compensation sensor. The compensation sensor includes a compensation sensor electrode disposed on the first substrate, a second conductive portion of the second substrate, and a compensation spring feature formed on the second substrate. The compensation spring feature is configured to facilitate a deflection of the second conductive portion relative to the compensation sensor electrode in response to a second force applied to the input device.

In general, in one aspect, embodiments relate to a processing system for an input device. The input device includes an input surface, a first substrate, and a second substrate. The first substrate includes a sensing region, a first substrate that includes a first plurality of proximity sensor electrodes, and a second substrate. The processing system includes a sensor module configured to obtain a first resulting signal based on a change in a first variable capacitance formed between a force sensor electrodes disposed on the first substrate and a first conductive portion disposed on the second substrate. The force sensor electrode and the first conductive portion are configured to detect a first force applied by one or more input objects to an input surface of the input device. The sensor module is further configured to obtain a second resulting signal based on a change in a second variable capacitance formed between a compensation sensor electrode and a second conductive portion disposed on the second substrate. The processing system further includes a determination module configured to determine force information corresponding to the first force based on the first resulting signal. The determination module is further configured to determine calibrated force information based on the second resulting signal and the force information. The input device further includes a compensation spring feature. The compensation spring feature is configured to facilitate a deflection of the second conductive portion to the compensation sensor electrode in response to a second force applied to the input device. The deflection of the second conductive portion is configured to change the second variable capacitance.

In general, in one aspect, embodiments relate to a method for manufacturing an input device. The method includes disposing a first force sensor electrode, a compensation sensor electrode, and a plurality of proximity sensor electrodes on a first substrate. The plurality of proximity sensor electrodes are configured to detect one or more input objects in a sensing region. The method further includes mechanically coupling a second substrate to the first substrate. The second substrate includes a first conductive portion, a second conductive portion, and a compensation spring feature. The force sensor electrode and the first conductive portion are configured to form a first variable capacitance for determination of a first force applied by the one or more input objects to an input surface of the input device. The compensation spring feature is configured to facilitate a deflection of the second conductive portion relative to the compensation sensor electrode in response to a second force applied to the input device. The deflection of the second conductive portion is configured to change a second variable capacitance formed between the second conductive portion and the compensation sensor electrode. The determination of the first force is based on the change in the second variable capacitance.

Other aspects of the invention will be apparent from the following description and the appended claims.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments provide input devices and methods that facilitate improved usability. In particular, one or more embodiments are directed to an input device that includes a force sensor and a compensation sensor. The force sensor may detect an input force applied by an input object to the input device, while the compensation sensor may detect one or more backgrounds forces applied to the input device. As such, force information determined with the compensation sensor may be used to calibrate force information determined for the input force.

Figure 1:
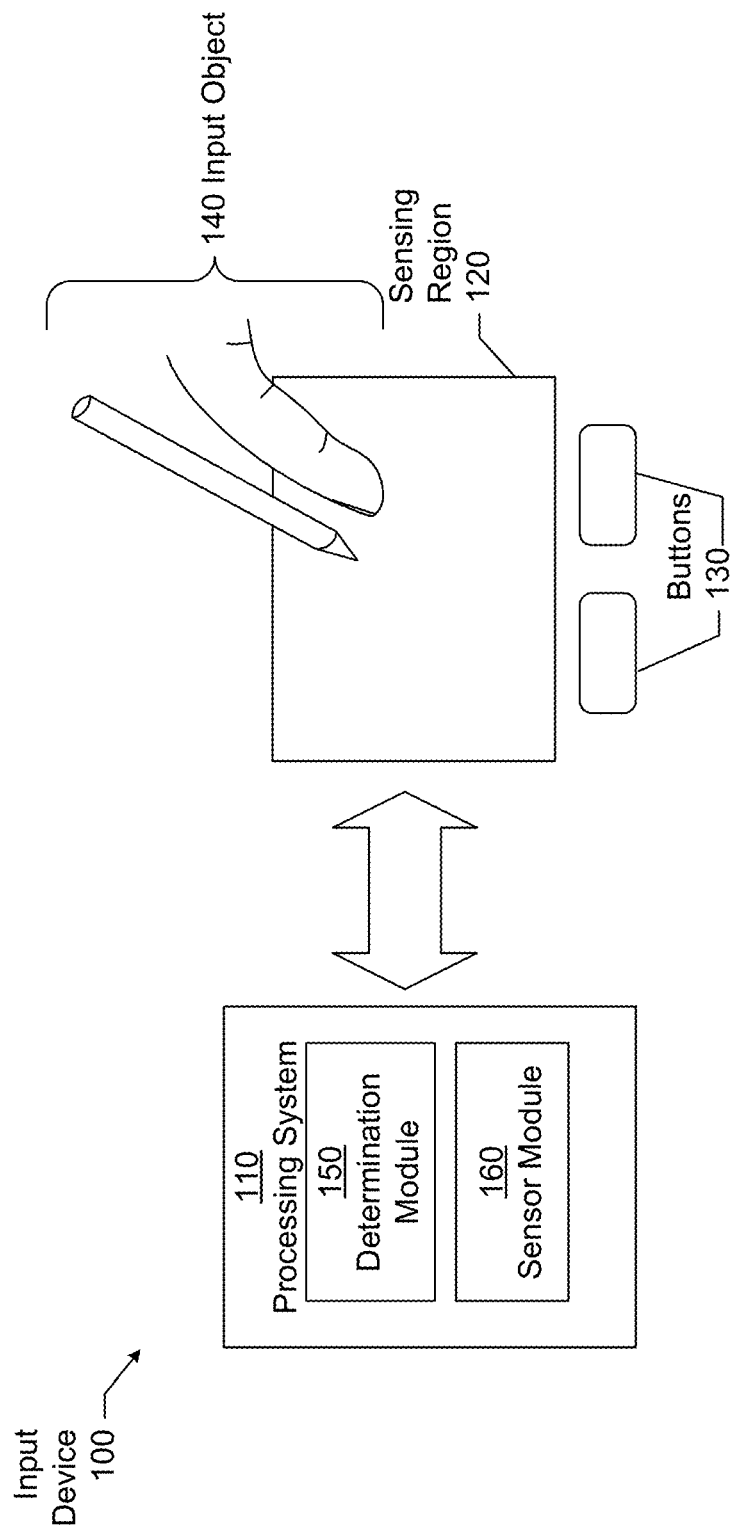
FIG. 1 shows a block diagram in accordance with one or more embodiments.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) as part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects exist in the sensing region (120). Further, which particular input objects are in the sensing region may change over the course of one or more gestures. For example, a first input object may be in the sensing region to perform the first gesture, subsequently, the first input object and a second input object may be in the above surface sensing region, and, finally, a third input object may perform the second gesture. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may use any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals (also called "sensing signal"). Receiver sensor electrodes may be held substantially constant relative to the reference voltage to facilitate receipt of resulting signals. The reference voltage may by a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g. other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, determine force information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

"Force information" as used herein is intended to broadly encompass force information regardless of format. For example, the force information may be provided for each object as a vector or scalar quantity. As another example, the force information may be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may configured for both display updating and input sensing. As another example, the display screen may be operated in part or in total by the processing system (110).

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

Figure 2:
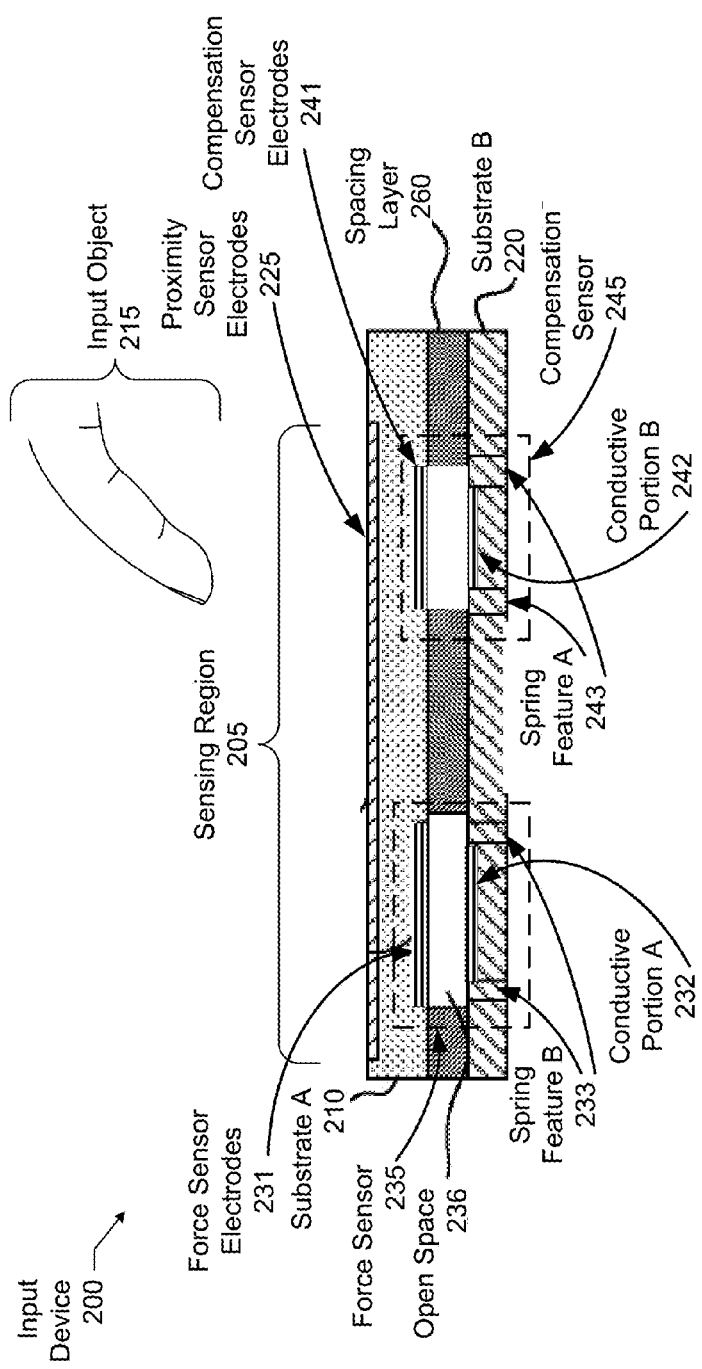
FIG. 2 shows a cross-sectional diagram in accordance with one or more embodiments.

Turning to FIG. 2, FIG. 2 shows a cross-sectional diagram in accordance with one or more embodiments. As shown in FIG. 2, an input device (200) may include one or more substrates (e.g., substrate A (210), substrate B (220)), a spacing layer (260) with various open spaces (e.g., open space (236)), a force sensor (235) or a multitude of force sensors, a compensation sensor (245), one or more conductive portions (e.g., conductive portion A (232), conductive portion B (242)), and one or more spring features (e.g., spring feature A (243), spring feature B (233)). On or above the input device (200) may be a sensing region (205) configured to detect an input object (215). In one or more embodiments, the input device (200) includes various proximity sensor electrodes (245) for detecting the presence of the input object (215) in the sensing region (205). In one or more embodiments, the force sensor (235) is configured for determining force information regarding an input force applied by the input object (215) to the input device (200). In one or more embodiments, the compensation sensor (245) is configured for calibrating force information regarding the input force based on various internal and/or external forces applied to the input device (200).

In one or more embodiments, the force sensor (235) includes various force sensor electrodes (231) and a conductive portion A (232). In one or more embodiments, for example, the force sensor electrodes (231) are disposed on the substrate A (210), while the conductive portion A (232) is disposed on the substrate B (220). In one or more embodiments, the configuration of the force sensor (235) is reversed (e.g., the force sensor electrodes (231) are disposed on substrate B (210) and the conductive portion A (232) is disposed on substrate A (210)).

In one or more embodiments, the force sensor electrodes (231) capacitively couple with the conductive portion A (232). The force sensor electrodes (231) may form various areas of variable capacitance between the force sensor electrodes (231) and the conductive portion A (232). By applying force to the substrate A (210), the conductive portion A (232) may deflect towards the force sensor electrodes (231), changing the distance between the conductive portion A (232) and the force sensor electrodes (231), and thus changing the variable capacitance. The magnitude of the change is related to the magnitude of the force. In one or more embodiments, a processing system (not shown) may obtain force information for input objects in the sensing region (205) based on resulting signals obtained from the force sensor electrodes (231).

In one or more embodiments, the force sensor (235) includes a spring feature B (233). The spring feature B (233) may have an inertial mass with a particular spring constant. For example, spring feature B (233) may be a leaf spring. As such, when forces are applied to substrate A (210), e.g., by the input object (215), the forces may cause various regions (not shown) of substrate B (220) to displace relative to the spring feature B (233) as a restoring force of the spring feature B (233) acts against various non-displaced regions of substrate B (220). Thus, the distance between force sensor electrodes (231) on substrate A (210) and conductive portion A (232) may decrease as a result of the applied forces.

Figure 5:
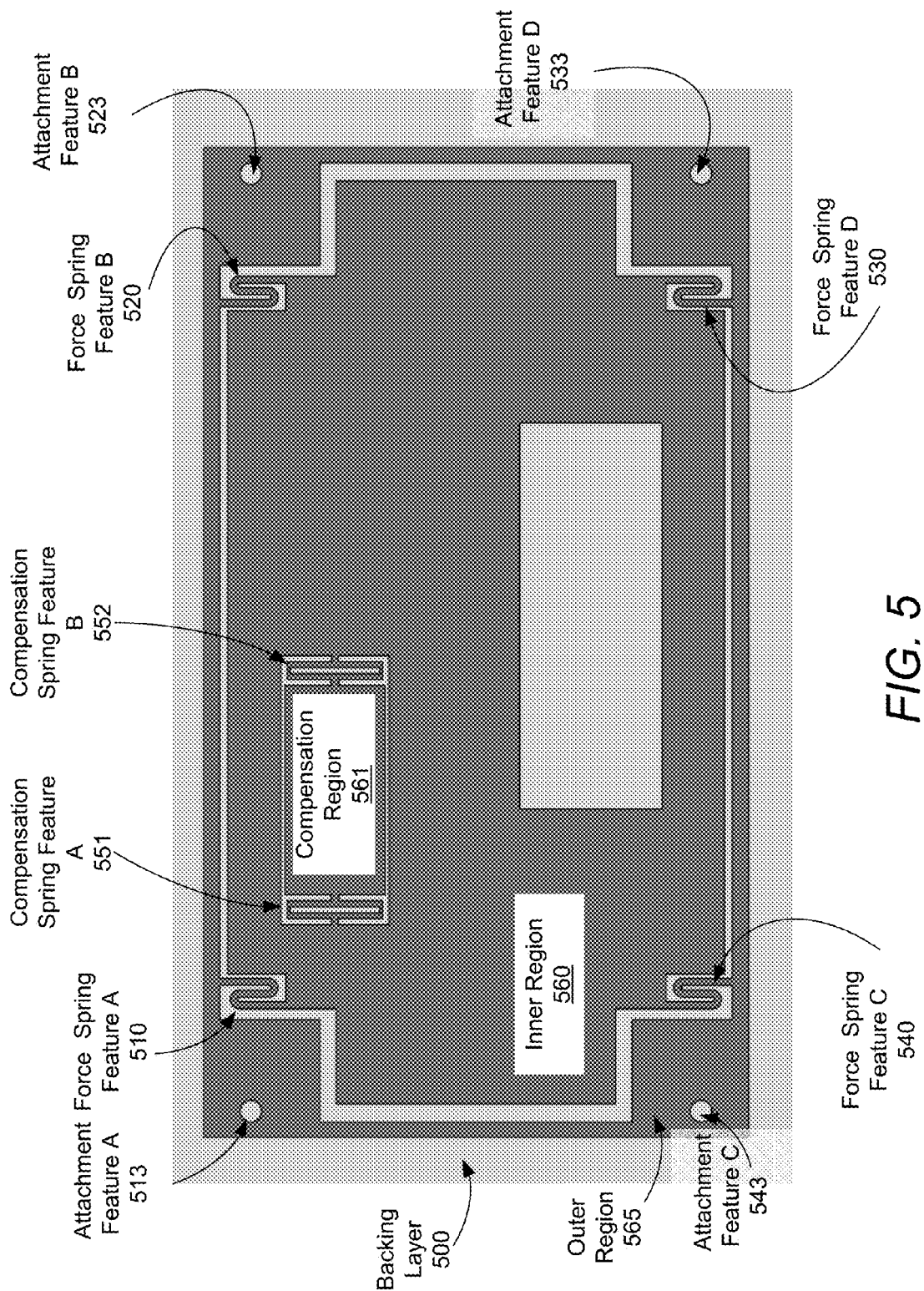
FIG. 5 shows a schematic diagram in accordance with one or more embodiments.

Turning to FIG. 5, FIG. 5 shows a schematic diagram of a system in accordance with one or more embodiments. As shown in FIG. 5, in one or more embodiments, a backing layer (500) includes various force spring features (e.g., force spring feature A (510), force spring feature B (520), force spring feature C (530), force spring feature D (540)), various compensation spring features (e.g., compensation spring feature A (551), compensation spring feature B (552)), and various attachment features (e.g., attachment feature A (513), attachment feature B (523), attachment feature C (533), attachment feature D (543)). The attachment features may be configured to mechanically couple with various substrates, such as a casing and/or other layer of an input device. For example, the attachment features may be configured using various attachment techniques such as welding, soldering, adhesives and the like. In one or more embodiments, the backing layer (500) is the substrate B (220) of FIG. 2.

In one or more embodiments, the backing layer (500) includes an inner region (560) and an outer region (565) for determining an input force. For example, where a force is applied on a substrate (not shown) above the inner region (560), the inner region (560) may displace relative to a spring feature (e.g., force spring feature C (530)), while the outer region (565) may maintain its original position. As such, in one or more embodiments, a processing system (not shown) determines the location of an applied force based on which region of the backing layer (500) is displaced.

In one or more embodiments, the backing layer (500) includes a compensation region (561) for a compensation sensor (not shown) adjoining various compensation spring features (e.g., compensation spring feature A (551), compensation spring feature B (552)). Similar to determining an input force, the compensation sensation region (561) is configured for determining a background force. In one or more embodiments, for example, the compensation spring features are disposed proximate a center region of the backing layer (500). As such, the force spring features may be disposed proximate an exterior edge of the backing layer (500).

In one or more embodiments, the compensation spring features (551, 552) are configured with spring constants less than the spring constants of the force spring features (510, 520, 530, 540). As such, a compensation sensor (not shown) having the compensation spring features (551, 552) may be configured to detect various internal and/or external forces to an input device with a different sensor sensitivity from various force sensors (not shown) having the force spring features (510, 520, 530, 540). In other words, the compensation sensor may detect various background forces that may not register with the force sensors.

Returning to FIG. 1, in one or more embodiments, the compensation sensor (245) includes various compensation sensor electrodes (241), a conductive portion B (242), and a spring feature A (243). The spring feature A (243), for example, may be similar to the compensation spring features (551, 552) from FIG. 5. In one or more embodiments, the compensation sensor electrodes (241) are disposed on substrate A (210), while the conductive portion B (242) is disposed on substrate B (220).

In one or more embodiments, the compensation sensor (245) is a microelectromechanical system (MEMS) device. For example, the compensation sensor electrodes (241) may determine acceleration in the Z-axis. In one or more embodiments, various conductive portions and sensor electrodes are disposed at locations around the spring feature A (243) for determining acceleration in the x and y axes. In one or more embodiments, the compensation sensor (245) is configured to measure pitch (i.e., rotation around a side-to-side axis), and/or roll (i.e., rotation around a front-to-back axis) of the input device (200). For example, the side-to-side axis and the front-to-back axis may be determined parallel to an input surface.

Figure 3:
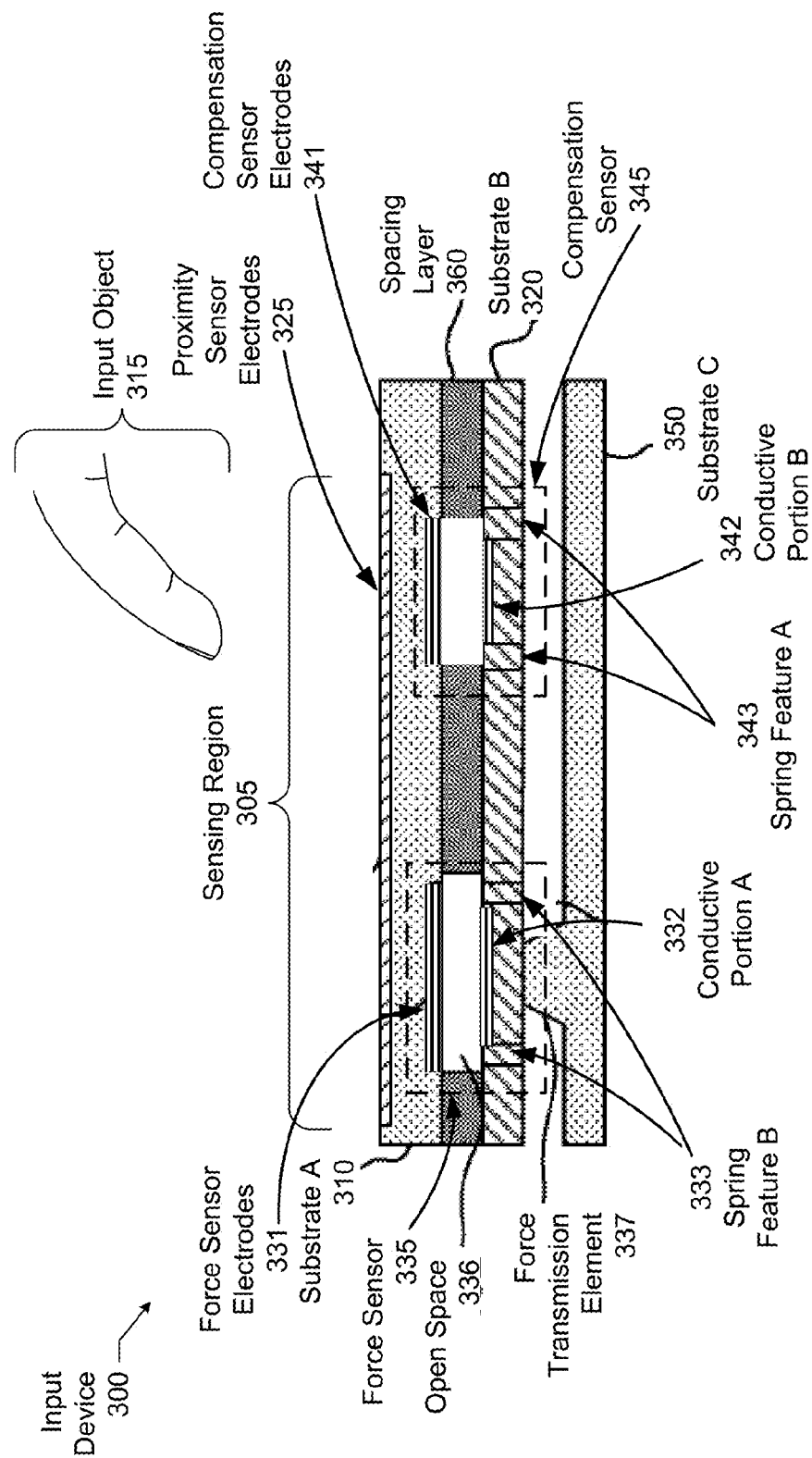
FIG. 3 shows a cross-sectional diagram in accordance with one or more embodiments.

Turning to FIG. 3, FIG. 3 shows a cross-sectional diagram in accordance with one or more embodiments. As shown in FIG. 3, an input device (200) may include one or more substrates (e.g., substrate A (310), substrate B (320), substrate C (350)), a spacing layer (360) with various open spaces (e.g., open space (336)), a force sensor (335), a compensation sensor (345), various conductive portions (e.g., conductive portion A (332), conductive portion B (342)), and various spring features (e.g., spring feature A (343), spring feature B (333)). The substrate C (350) may be a casing for the input device (300). Similar to FIG. 2, the input device (300) may include a sensing region (305) that includes an input object (315), and various proximity sensor electrodes (325).

In one or more embodiments, the input device (300) includes a force transmission element (337). For example, the force transmission element (337) may be configured to transmit force to the conductive portion A (332). Specifically, the force transmission element (337) may be mechanically coupled to the substrate B (320). When the input object (315) applies force to the input device (300), the force transmission element (337) may displace the conductive portion A (332) relative to the force sensor electrodes (331). This displacement may change the variable capacitance between the conductive portion A (332) and the force sensor electrodes (331), and thus a processing system (not shown) may obtain force information from a resulting signal of the force sensor electrodes (331). For example, when an external force moves substrate C (350), force transmission element (337) moves the conductive portion A (332) in a given direction. However, by inertia, conductive portion B (342) moves in an opposite direction. The processing system (not shown) can use the information from the compensation sensor (345) to counteract any motion or forces that were interpreted to be caused by input object (315).

Figure 4:
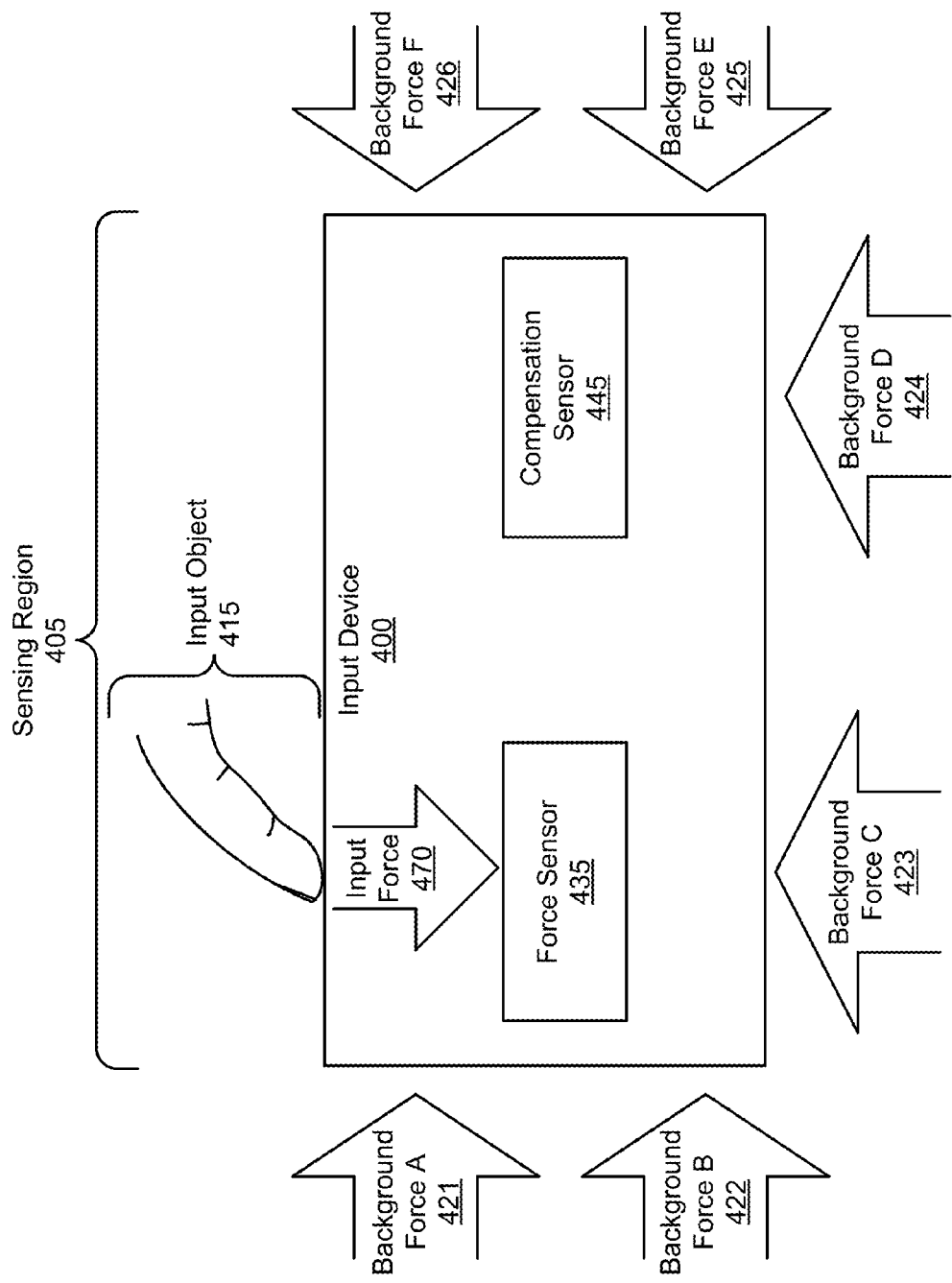
FIG. 4 shows a block diagram in accordance with one or more embodiments.

Turning to FIG. 4, FIG. 4 shows a block diagram of a system in accordance with one or more embodiments. As shown in FIG. 4, in one or more embodiments, an input device (400) may include a force sensor (435) and a compensation sensor (445). For example, the force sensor (435) may detect an input force (470) applied to the input device (400) by an input object (415) in a sensing region (405). While the force sensor (435) is operating, the environment around the input device (400) may include various background forces (e.g., background force A (421), background force B (422), background force C (423), background force D (424), background force E (425), background force F (426)). For example, the background forces may include various vibrations and/or various sudden changes in acceleration (e.g., an upward jerk by the input device (400) caused by a car hitting a bump), that generates noise in measurements obtained by the force sensor (435). As such, the background forces may produce in the force sensor (435) a false detection and/or inaccurate measurements of the input force (470).

Furthermore, for example, a processing system (not shown) may obtain force information from the force sensor (435) that includes both the input force (470) and the background force C (423). For example, while the input force (470) is applied to the input device (400) in one direction, the background force C (423) may be applied to the input device (400) in a direction substantially opposite the direction of the input force (470). As such, force information regarding the magnitude of the input force (470) may be adjusted by the magnitude of the background force C (423).

In one or more embodiments, the processing system separates the force information regarding the input force (470) from the force information obtained from the force sensor (435) using the compensation sensor (445). For example, the compensation sensor (445) may be configured to measure one or more of the background forces (421)-(426) for determining a calibrated force measurement regarding the input force (470). In one or more embodiments, the calibrated force measurement includes a magnitude and/or direction of the input force (470) that is adjusted based on the one or more measured background forces.

Figure 6:
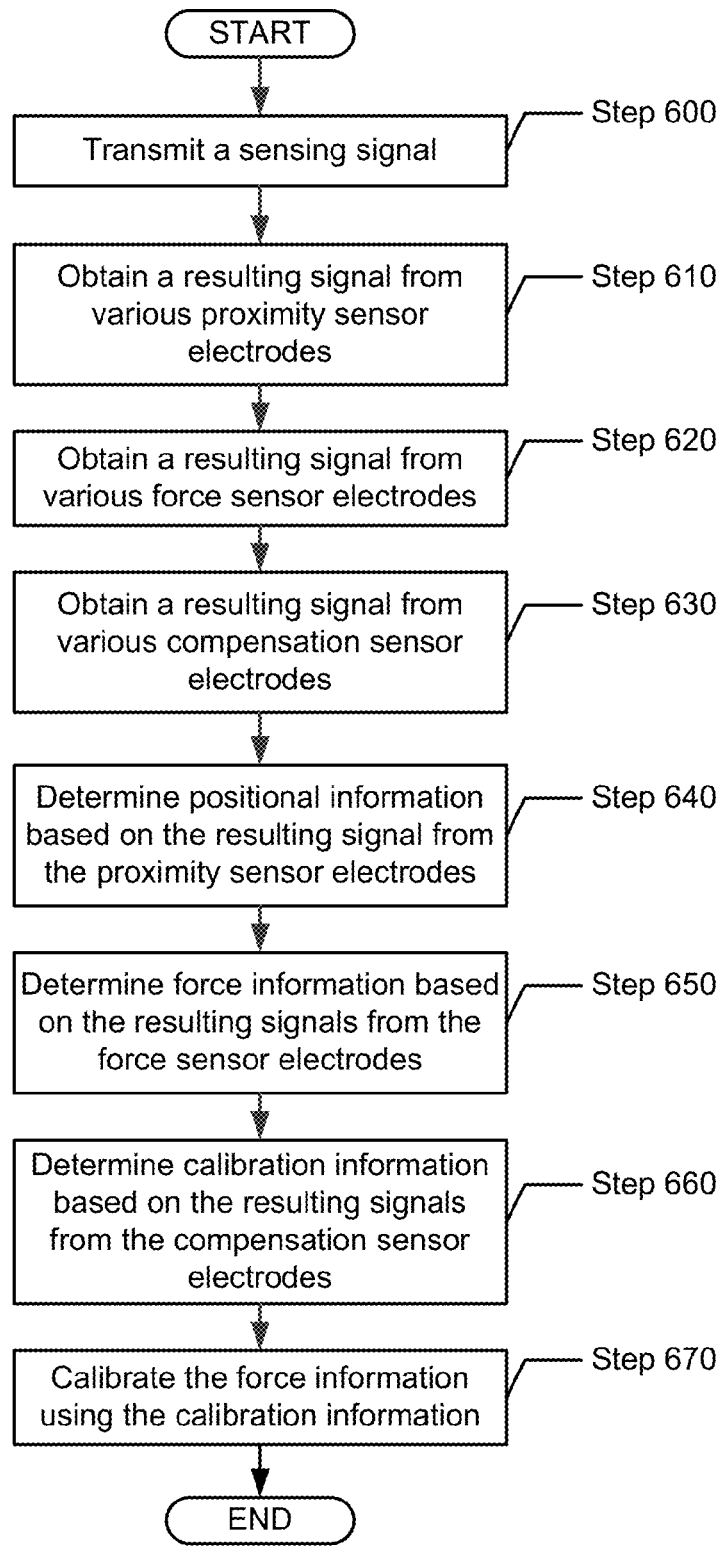
FIG. 6 and FIG. 7 show flowcharts in accordance with one or more embodiments.

Turning to FIG. 6, FIG. 6 shows a flowchart in accordance with one or more embodiments. The process shown in FIG. 6 may involve, for example, one or more components discussed above in reference to FIGS. 1-5 (e.g., processing system (110)). One or more steps shown in FIG. 6 may be omitted, repeated, and/or performed in a different order among different embodiments. Accordingly, embodiments should not be considered limited to the specific number and arrangement of steps shown in FIG. 6.

In Step 600, a sensing signal is transmitted in accordance with one or more embodiments. For example, the sensing signal may be applied to various conductive portions of an input device to form areas of variable capacitance for various proximity sensors, force sensors, and/or compensation sensors in an input device. For more information on sensing signals (also called "transmitter signals"), see FIG. 1 and the accompanying description.

In Step 610, various resulting signals are obtained from various proximity sensor electrodes in accordance with one or more embodiments. In response to the sensing signal in Step 600, for example, various resulting signals may be received at a sensing module corresponding to various effects of the sensing signal on the proximity sensor electrodes. For more information on resulting signals from receiver electrodes, see FIG. 1 and the accompanying description.

In Step 620, various resulting signals are obtained from various force sensor electrodes in accordance with one or more embodiments. Similar to Step 610, for example, various resulting signals may be received at a sensing module corresponding to various effects of the sensing signal on the force sensor electrodes. For more information on resulting signals from receiver electrodes, see FIG. 1 and the accompanying description.

In Step 630, various resulting signals are obtained from various compensation sensor electrodes in accordance with one or more embodiments. Similar to Step 610, for example, various resulting signals may be received at a sensing module corresponding to various effects of the sensing signal on the compensation sensor electrodes. For more information on resulting signals from receiver electrodes, see FIG. 1 and the accompanying description.

In Step 640, positional information is determined based on the resulting signals from the proximity sensor electrodes in accordance with one or more embodiments. In one or more embodiments, for example, a processing system receives resulting signals from one or more systems similar to the ones shown in FIGS. 2-5.

In Step 650, force information is determined based on the resulting signals from the force sensor electrodes in accordance with one or more embodiments. For more information on force information, see FIG. 1 and the accompanying description.

In Step 660, calibration information is determined based on the resulting signals from the compensation sensor electrodes in accordance with one or more embodiments. In one or more embodiments, for example, the calibration information includes force information obtained by one or more compensation sensors. As such, the calibration information may describe various background forces and/or noise, such as internal vibrations, within an input device. For more information on compensation sensors, see FIGS. 2-5 and the accompanying description.

In Step 670, force information is calibrated using the calibration information in accordance with one or more embodiments. For example, in one or more embodiments, the processing system determines a value of a background force component with respect to one axis (e.g., z-axis, side-to-side axis, etc.). As such, using the force information acquired in Step 650, the processing system may adjust an input force component for the same axis as the background force component. The processing system may also use noise filtering and/or compensation techniques based on the calibration information. In some embodiments, significant force information from step 640 may indicate that the force information from step 620—and/or even the positional information from step 610—should be temporarily delayed, ignored, or specially processed. "Specially processed" meaning that "jumpback" might be applied to any motion of the object in step 610 while the force was detected in step 630 (i.e. moving the cursor back to a previous position.

In one or more embodiments, the processing system determines a calibrated component value using various compensation sensor characteristics, such as the spring constant of a compensation spring feature, the inertial mass of a conductive portion for the compensation sensor, and various changes in variable capacitance between compensation sensor electrodes and the conductive portion.

Figure 7:
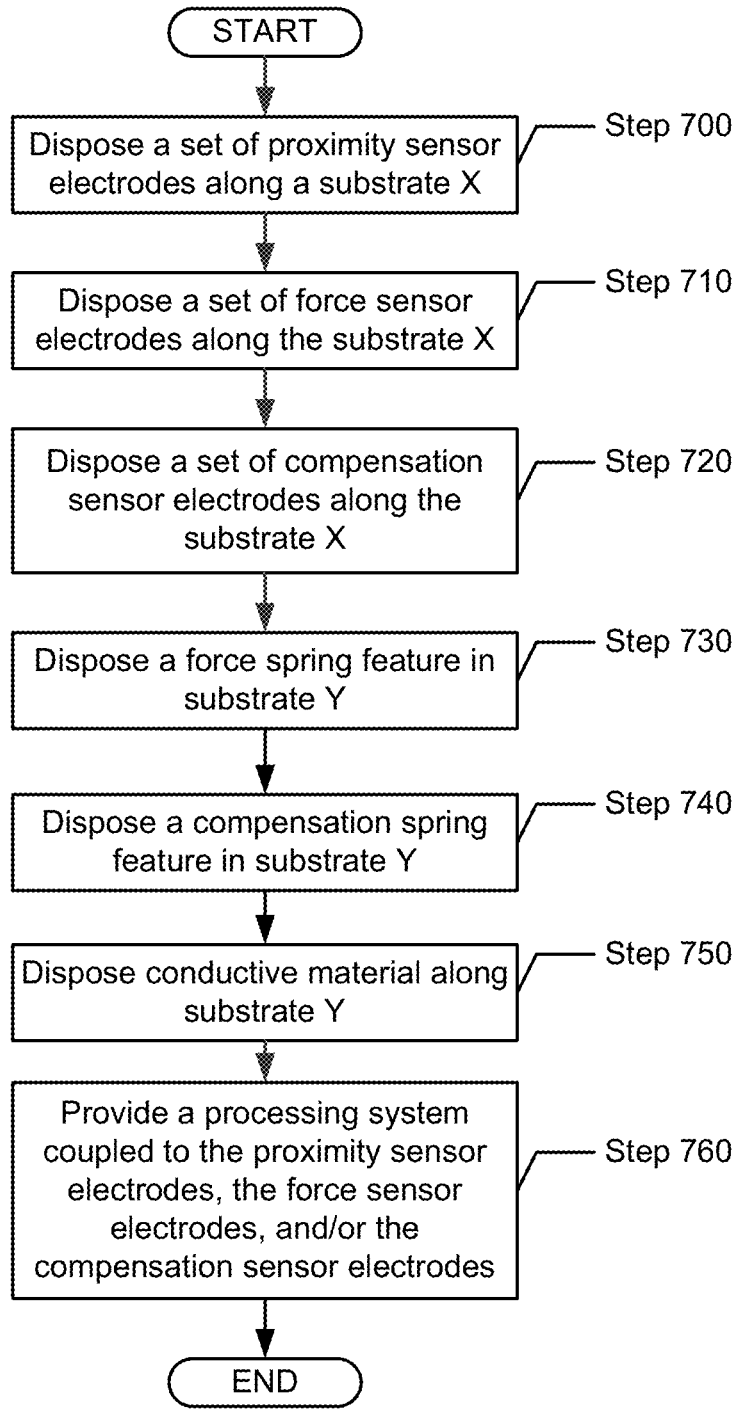

Turning to FIG. 7, FIG. 7 shows a method for manufacturing an input device in accordance with one or more embodiments. In Step 700, a set of proximity sensor electrodes are disposed along a substrate X in accordance with one or more embodiments. For more information on proximity sensor electrodes, see FIGS. 1-3 and the accompanying description.

In Step 710, a set of force sensor electrodes are disposed along the substrate X in accordance with one or more embodiments. For more information on force sensor electrodes, see FIGS. 1-4 and the accompanying description.

In Step 720, a set of compensation electrodes are disposed along the substrate X in accordance with one or more embodiments. In one or more embodiments, substrate X is substrate A (210) in FIG. 2. For more information on compensation sensor electrodes, see FIGS. 2-4 and the accompanying description.

In Step 730, a force spring feature is disposed along a substrate Y in accordance with one or more embodiments. In one or more embodiments, substrate Y is substrate B (220) in FIG. 2. For more information on force spring features, see FIGS. 2-5 and the accompanying description.

In Step 740, a compensation spring feature is disposed along a substrate Y in accordance with one or more embodiments. For more information on force spring features, see FIGS. 2-5 and the accompanying description.

In Step 750, conductive material is disposed along substrate Y in accordance with one or more embodiments. The conductive material may include various conductive portions for force sensor electrodes, compensation sensor electrodes, and/or proximity sensor electrodes. For more information on conductive portions, see FIGS. 2-5 and the accompanying description.

In Step 750, conductive material is disposed along substrate Y in accordance with one or more embodiments. The conductive material may include various conductive portions for force sensor electrodes, compensation sensor electrodes, and/or proximity sensor electrodes. For more information on conductive portions, see FIGS. 2-5 and the accompanying description.

In Step 760, a processing system is communicatively coupled to the proximity sensor electrodes, the force sensor electrodes, and/or the compensation sensor electrodes in accordance with one or more embodiments. For more information on various operations performed by the processing system, see FIGS. 1-6 and the accompanying description.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. An input device, comprising:
 a first substrate comprising a plurality of proximity sensor electrodes, wherein the plurality of proximity sensor electrodes is configured to detect one or more input objects in a sensing region;
 a second substrate coupled to the first substrate, the second substrate comprising a first conductive portion;
 a force sensor comprising a force sensor electrode disposed on the first substrate, a force spring feature comprising a first spring constant, and a first conductive portion disposed in the second substrate, wherein the force sensor electrode and the first conductive portion are configured to form a first variable capacitance for a determination of a first force applied by the one or more input objects to an input surface of the input device; and a compensation sensor comprising a compensation sensor electrode disposed on the first substrate, a second conductive portion of the second substrate, and a compensation spring feature comprising a second spring constant and formed in the second substrate, wherein the first spring constant of the force sensor is greater than the second spring constant of the compensation sensor, wherein the second spring constant is configured to produce a first sensor sensitivity in the compensation sensor that is different than a second sensor sensitivity in the force sensor, wherein the compensation spring feature is configured to facilitate a deflection of the second conductive portion relative to the compensation sensor electrode in response to a second force applied to the input device, wherein the deflection of the second conductive portion is configured to change a second variable capacitance formed between the second conductive portion and the compensation sensor electrode, and wherein the determination of the first force is based on the change in the first and second variable capacitance.

2. The input device of claim 1, further comprising:
a spacing layer disposed between the first substrate and the second substrate,
wherein the spacing layer provides a first separation between the force sensor electrode and the first conductive portion, and
wherein the spacing layer provides a second separation between the compensation sensor electrode and the second conductive portion.

3. The input device of claim 1, further comprising:
a third substrate coupled to the second substrate,
wherein the third substrate comprises a transmission element, and
wherein the transmission element is configured to deflect the first conductive portion toward the force sensor electrode in response to the first force applied by the one or more input objects to the input surface.

4. The input device of claim 1, further comprising:
wherein the force spring feature is configured to facilitate a deflection of the force sensor electrode relative to the first conductive portion to change the first variable capacitance.

5. The input device of claim 1,
wherein the compensation spring feature is disposed proximate a center region of the second substrate, and
wherein the force spring feature is disposed proximate an exterior edge of the second substrate.

6. The input device of claim 1,
wherein the first force is applied to the first substrate in a first direction,
wherein the second force is applied to the second substrate in a second direction, and
wherein the second direction is substantially opposite the first direction.

7. The input device of claim 1,
wherein the second force is a vibration internal to the input device.

8. The input device of claim 1,
wherein the input device is communicatively coupled with a processing system comprising: a determination module configured for processing a first resulting signal and a second resulting signal,
wherein the first resulting signal is based on the change in the first variable capacitance, and wherein the second resulting signal is based on the change in the second variable capacitance.

9. A processing system for an input device comprising a sensing region, a first substrate comprising a first plurality of proximity sensor electrodes, and a second substrate, the processing system comprising:
a sensor module configured to:
obtain, using a force sensor comprising a force spring feature with a first spring constant, a first resulting signal based on a change in a first variable capacitance formed between at least one force sensor electrode disposed on the first substrate and a first conductive portion disposed on the second substrate, wherein the at least one force sensor electrode and the first conductive portion are configured to detect a first force applied by one or more input objects to an input surface of the input device; and
obtain, using a compensation sensor comprising a compensation spring feature with a second spring constant, a second resulting signal based on a change in a second variable capacitance formed between a compensation sensor electrode and a second conductive portion disposed on the second substrate,
wherein the first spring constant of the force sensor is greater than the second spring constant of the compensation sensor, and
wherein the second spring constant is configured to produce a first sensor sensitivity in the compensation sensor that is different than a second sensor sensitivity in the force sensor; and
a determination module configured to:
determine force information corresponding to the first force based on the first resulting signal from the force sensor;
determine calibrated force information based on the second resulting signal from the compensation sensor and the force information,
wherein the compensation spring feature is configured to facilitate a deflection of the second conductive portion relative to the compensation sensor electrode in response to a second force applied to the input device, and
wherein the deflection of the second conductive portion is configured to change the second variable capacitance.

10. The processing system of claim 9,
wherein the first force is applied to the first substrate in a first direction,
wherein the second force is applied to the second substrate in a second direction, and
wherein the second direction is substantially opposite the first direction.

11. The processing system of claim 9,
wherein the force spring feature is configured to facilitate a deflection of the force sensor electrode relative to the first conductive portion to change the first variable capacitance.

12. The processing system of claim 9,
wherein the compensation spring feature is disposed proximate a center region of the second substrate, and
wherein the force spring feature is disposed proximate an exterior edge of the second substrate.

13. The processing system of claim 9,
wherein the determination module is further configured to:
determine, from the first resulting signal, a first force component value corresponding to the first force;
determine, from the second resulting signal, a second force component value corresponding to the second force; and determine a calibrated force component value based on adding the second force component value to the first force component value.

14. The processing system of claim 13, wherein the calibrated force component value is based on the change in the second variable capacitance, the second spring constant of the compensation spring feature, and a mass having the second conductive portion.

15. A method for manufacturing an input device, comprising:
disposing a force sensor electrode, a compensation sensor electrode, and a plurality of proximity sensor electrodes on a first substrate, wherein the plurality of proximity sensor electrodes are configured to detect one or more input objects in a sensing region; and
coupling a second substrate to the first substrate, the second substrate comprising a first conductive portion, a second conductive portion, a force spring feature, and a compensation spring feature, wherein the force sensor electrode, the first conductive portion, and the force spring feature form a force sensor, wherein the compensation sensor electrode, the second conductive portion, and the compensation spring feature form a compensation sensor,
wherein the force sensor electrode and the first conductive portion are configured to form a first variable capacitance for determination of a first force applied by the one or more input objects to an input surface of the input device,
wherein the compensation spring feature is configured to facilitate a deflection of the second conductive portion relative to the compensation sensor electrode in response to a second force applied to the input device,
wherein the deflection of the second conductive portion is configured to change a second variable capacitance formed between the second conductive portion and the compensation sensor electrode,
wherein the first spring constant of the force sensor is greater than the second spring constant of the compensation sensor,
wherein the second spring constant is configured to produce a first sensor sensitivity in the compensation sensor that is different than a second sensor sensitivity in the force sensor, and wherein the determination of the first force is based on the change in the second variable capacitance.

16. The method of claim 15, further comprising:
communicatively coupling a processing system to the force sensor electrode and the compensation sensor electrode, the processing system comprising a determination module configured for processing a first resulting signal and a second resulting signal,
wherein the first resulting signal is based on a change in the change in the first variable capacitance between the force sensor electrode and the first conductive portion, and
wherein the second resulting signal is based on the change in the second variable capacitance formed between the compensation sensor electrode and the second conductive portion.

17. The method of claim 16, wherein the determination module is further configured to:
determine force information applied by the input object to the sensing region based on the first resulting signal; and
determine calibrated force information based on the second resulting signal and the force information.

18. The method of claim 15, further comprising:
coupling a third substrate to the second substrate,
wherein the third substrate comprises a transmission element, and
wherein the transmission element is configured to deflect the first conductive portion toward the force sensor electrode in response to the first force applied by the input object to the first substrate.

19. The input device of claim 1, wherein the compensation sensor is configured to determine a magnitude of a background force that adjusts force information regarding the first force.

20. The processing system of claim 9, wherein the determination module is further configured to:
determine a magnitude of a background force based on the second resulting signal from the compensation sensor; and
adjust, using the magnitude of the background force, the force information to produce calibrated force information.

* * * * *